United States Patent [19]

Motojima et al.

[11] 4,222,892
[45] Sep. 16, 1980

[54] PROCESS FOR PREPARING OXINE IMPREGNATED-ACTIVATED CHARCOAL

[75] Inventors: Kenji Motojima; Enzo Tachikawa; Hideo Kamiyama, all of Mito, Japan

[73] Assignee: Japan Atomic Energy Research Institute, Tokyo, Japan

[21] Appl. No.: 925,824

[22] Filed: Jul. 18, 1978

[30] Foreign Application Priority Data

Jul. 21, 1977 [JP] Japan .................................. 52/87678

[51] Int. Cl.² ............................................. B01J 31/02
[52] U.S. Cl. ............................ 252/428; 252/301.1 W; 252/426; 252/444; 423/DIG. 14

[58] Field of Search ....... 252/426, 428, 444, 301.1 W; 210/38 B, 38 C; 423/100, 139

[56] References Cited

U.S. PATENT DOCUMENTS

| | | | |
|---|---|---|---|
| 3,923,615 | 12/1975 | Kane et al. | 423/139 |
| 4,033,764 | 7/1977 | Colegate et al. | 423/100 |

*Primary Examiner*—P. E. Konopka
*Attorney, Agent, or Firm*—Browdy and Neimark

[57] ABSTRACT

A process is, herein, disclosed for preparing oxine impregnated-activated charcoal comprising contacting solid oxine with activated charcoal.

3 Claims, No Drawings

PROCESS FOR PREPARING OXINE IMPREGNATED-ACTIVATED CHARCOAL

BACKGROUND OF THE INVENTION (1) Field of the Invention

This invention relates to a process for preparing oxine impregnated-activated charcoal.

(2) Description of the Prior Art

Oxine (8-hydroxyquinoline) was first prepared about 100 years ago and it was introduced as an analytical reagent in 1926. Many investigations have been carried out on the reagent and it has proven to be one of the most valuable analytical reagents available for the separation and gravimetric, volumetric and photometric determination of many metals. Oxine forms stable and water-insoluble chelates with many metals.

The inventors of this invention have developed a method of removing radionucleides from the cooling and leakage-water from nuclear reactors using the properties of oxine as stated above. The principle of the method is simple and comprises adding an oxine into the cooling-water of the nuclear reactor or leakage-water therefrom to form water-insoluble and stable complexes of the radionucleides contained therein and adsorbing them on activated charcoal. Many kinds of operations can be employed in the method, for example an operation using activated charcoal on which oxine is adsorbed, a batchwise operation in which activated charcoal is added after addition of oxine, or a continuous operation using an activated charcoal column. However, the operation using activated charcoal on which an oxine is impregnated is recommended.

On the other hand, Japanese Patent Application Publication No. 8281/1972 discloses a method of removing heavy metals such as mercury, copper, chromium etc. from a water solution containing the heavy metals using an activated charcoal or silica gel on which oxine is adsorbed and carried.

The conventional method for preparing oxine impregnated activated charcoal comprises dissolving oxine in proper solvents and passing the solution through a column of activated charcoal or dipping the activated charcoal in the solution with stirring so that the activated charcoal adsorbs the solution and finally removing the solvents. However, the conventional method suffers from the defect that a large amount of organic solvent is required, because oxine is not readily soluble in water. In addition to that, organic solvents are particularly troublesome to handle and remove.

An easy and effective method for preparing an oxine impregnated-activated charcoal has been, therefore, long sought in the art.

SUMMARY OF THE INVENTION

It is an object of this invention to provide a novel method for preparing an oxine impregnated-activated charcoal. It is a particular object of this invention to provide a novel method for preparing an oxine impregnated-activated charcoal comprising contacting solid oxine with activated charcoal.

Other objects and features will be in part apparent and in part pointed out hereinafter.

DETAILED DESCRIPTION OF THE INVENTION

This invention relates to a method for preparing an oxine impregnated-activated charcoal.

The term "oxine" in the present invention means 8-hydroxyquinoline and derivatives thereof.

The inventors of the present invention have carried out a variety of experiments to achieve the object of this invention. In the course of these experiments, the inventors have found that an oxine can be easily adsorbed by the activated charcoal simply by mixing solid oxine with the activated charcoal. This phenomenon proceeds in the air as well as in water and is explained as stated below.

(1) Reaction of an oxine with an activated charcoal in the air (hereinafter referred as "method (1)":

The boiling point and melting point at atmospheric pressure of oxine are approximately 270° C. and 74° C. respectively and the vapor pressure at around room temperature of oxine is not so high. Furthermore, since the molecular weight of oxine is relatively large (145.2), the diffusion rate of gaseous oxine is not so high. Therefore, the surface of solid oxine is covered and saturated with gaseous oxine and after equilibrium is established, the vaporization of oxine scarcely proceeds. However, when activated charcoal exists in contact with solid oxine, the oxine vaporized is quickly adsorbed by the activated charcoal and removed from the surface of solid oxine. Accordingly, the equilibrium state between solid oxine and gaseous oxine is broken and oxine is rapidly vaporized and is adsorbed by the activated charcoal. Therefore, when a sufficient amount of activated charcoal for oxine exists in reaction system, all of the solid oxine is adsorbed by the activated charcoal. The reaction as stated above is illustrated as follows:

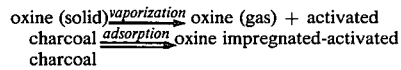

(2) Reaction of oxine with activated charcoal in water (hereinafter referred as "method (2)"):

Oxine is readily soluble in organic solvents such as alcohol, acetone, chloroform etc., and is relatively soluble in acidic or alkaline aqueous solution. However, it is only slightly soluble in water; that is, the solubility of oxine in water is approximately 0.05 g/l. However, when activated charcoal exists in the reaction system, the oxine dissolved in water is rapidly adsorbed by the activated charcoal and removed from the reaction system. Therefore, when a sufficient amount of activated charcoal for oxine exists in the reaction system, all of the solid oxine is adsorbed by the activated charcoal. The reaction as stated above is illustrated as follows

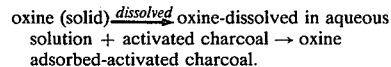

In accordance with the method (1) or method (2) as explained above, an oxine can be quantitatively adsorbed by activated charcoal in its saturation amount regardless of the kind or shape of the activated charcoal. In the method of this invention, the adsorption of oxine by activated charcoal proceeds relatively rapidly, but it does not proceed instantaneously. Therefore, if the proper means of mixing the reaction system is adopted according to the particle size of activated charcoal used in this invention, homogeneous products can easily be obtained.

The preferred oxine useful in the present invention is needle-like or scaly crystalline powder.

The reaction conditions used in the present invention such as temperature, pressure etc., are not specifically restricted, except that temperatures above the melting point of oxine and temperatures below the freezing point of the oxine containing aqueous solution must be avoided in the present invention. The method (1) of the present invention can be carried out under vacuum or one or more inactive gases which do not react with oxine and activated charcoal. The method (2) of the present invention can be carried out in the presence of solutions and/or solutes which do not react with oxine and activated charcoal. In accordance with the present invention, compounds having properties similar to those of oxine together with oxine can be adsorbed by activated charcoal; an oxine and a derivative thereof such as 8-hydroxyquinaldine can be simultaneously adsorbed by activated charcoal to improve the properties thereof.

Those skilled in the art will gain a further understanding of this invention from the following examples which illustrate but do not limit the invention.

EXAMPLE 1

This example illustrates the reaction of oxine with activated-charcoal in the air.

A twin-cylinder mixer was charged with 1000 g of coconut shell activated charcoal of 12 – 32 mesh and 100 g of oxine crystalline powder and rotated at 40 r.p.m. After 30 minutes, the oxine added was completely adsorbed by the activated charcoal and an oxine adsorbed-activated charcoal (100 : 10) was obtained.

In the reaction of oxine with activated charcoal in the air, the gases (air components) adsorbed by activated charcoal are replaced with oxine to be released into the reaction system and therefore the pressure in the reaction system is slighlty increased. However, since the increase in pressure in the reaction system is less than 1/50 – 60 atmospheric pressure, the reaction of oxine with activated charcoal in the air can be carried out in a closed vessel.

It was determined that approximately 35% by weight of the oxine added had been adsorbed by the activated charcoal.

EXAMPLE 2

This example illustrates the reaction of oxine with activated charcoal in water.

Into a flask of 1000 cc was put 100 g of coconut shell activated charcoal of 12 – 32 mesh, 500 cc of water and 10 g of oxine crystalline powder and shaken gently. After 30 minutes, the oxine was completely adsorbed by the activated charcoal.

It was determined that approximately 35% by weight of the oxine added had been adsorbed by the activated charcoal.

What is claimed is:

1. A process for preparing oxine adsorbed-activated charcoal which comprises contacting solid oxine with activated charcoal until the activated charcoal becomes impregnated with the oxine.

2. The process of claim 1, wherein the contact of the solid oxine with the activated charcoal is carried out in the air.

3. The process of claim 1, wherein the contact of the solid oxine with the activated charcoal is carried out in water.

* * * * *